US006546296B1

(12) United States Patent
Hara

(10) Patent No.: US 6,546,296 B1
(45) Date of Patent: Apr. 8, 2003

(54) CALIBRATION METHOD FOR TWO-STAGE ACTUATOR CONTROL SYSTEM

(75) Inventor: Takeyori Hara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 379 days.

(21) Appl. No.: 09/675,123

(22) Filed: Sep. 28, 2000

(30) Foreign Application Priority Data

Oct. 12, 1999 (JP) .......................................... 11-289086

(51) Int. Cl.⁷ ............................................... G05B 13/02
(52) U.S. Cl. ......................................... 700/37; 360/69
(58) Field of Search ............................ 700/38, 37, 51, 700/32, 28; 360/69, 75

(56) References Cited

U.S. PATENT DOCUMENTS

| | | | | | |
|---|---|---|---|---|---|
| 4,646,226 A | * | 2/1987 | Moon | ............................ | 700/71 |
| 4,698,745 A | * | 10/1987 | Hiroi et al. | .................... | 700/45 |
| 4,890,172 A | * | 12/1989 | Watt et al. | ................ | 360/77.04 |
| 5,189,578 A | * | 2/1993 | Mori et al. | ............... | 360/294.6 |
| 6,088,187 A | * | 7/2000 | Takaishi | ................... | 360/78.05 |
| 6,101,058 A | * | 8/2000 | Morris | ......................... | 360/69 |
| 6,263,251 B1 | * | 7/2001 | Rutschmann | ................ | 700/37 |
| 6,414,827 B1 | * | 7/2002 | Young et al. | ............. | 360/78.09 |

* cited by examiner

Primary Examiner—Ramesh Patel
Assistant Examiner—Edward F. Gain, Jr.
(74) Attorney, Agent, or Firm—Greer, Burns & Crain, Ltd.

(57) ABSTRACT

Disclosed herein is a calibration method for a two-stage actuator control system. The calibration method includes the steps of inserting a sinusoidal disturbance $d_v(k)$ into a control input $u_v(k)$ to a main actuator, comparing $u_v(k)$ and $u_v(k)+d_v(k)$ to obtain an open-loop gain, and setting the reciprocal of the open-loop gain in a gain compensator for the main actuator. The calibration method further includes the steps of adding a sinusoidal disturbance $d_p(k)$ to an input to a subactuator, and comparing the sinusoidal disturbance $d_p(k)$ with an output $y(k)$ from the two-stage actuator to obtain a disturbance input-displacement gain. A design nominal value is divided by the disturbance input-displacement gain to obtain a compensation gain, which is then set in a gain compensator for the subactuator.

12 Claims, 7 Drawing Sheets

CALIBRATION METHOD FOR TWO-STAGE ACTUATOR CONTROL SYSTEM

BACKGROUND OF THE INVENTION

1. Field of the Invention

The present invention relates to a calibration method for a feedback control system for a two-stage actuator.

2. Description of the Related Art

In recent years, the size and thickness of a magnetic disk drive as a kind of external storage device for a computer have increasingly been reduced, and a low power consumption has been desired. Further, high-density recording on a magnetic disk drive has also been required. For realization of high-density recording on a magnetic disk drive, it is essential to increase the number of tracks per unit length on a magnetic disk, that is, to reduce the width of each track. It is therefore necessary to position a magnetic head on a narrow track, causing the necessity of improvement in head positioning accuracy.

In a general magnetic disk drive, an actuator arm is rotatably mounted on a base, and a suspension is fixed at its base end portion to one end of the actuator arm. A slider carrying a magnetic head is mounted on a front end portion of the suspension. A coil is mounted on the other end of the actuator arm, and a magnetic circuit is fixed to the base of the magnetic disk drive. The coil and the magnetic circuit constitute a voice coil motor. By passing an electric current through the coil, the coil is forced to rotate the actuator arm.

Such a general single actuator has the following problems.

(a) In an actuator used in a general 2.5-inch or 3.5-inch magnetic disk drive, there occurs resonance due to the rigidity of an actuator arm at 10 kHz or less. It is difficult to greatly raise this resonance frequency because of various constraints including yaw angle conditions and power consumption.

(b) The resonance frequency of an actuator translation mode due to the rigidity of bearings also appears at 10 kHz or less, e.g., 4 kHz to 5 kHz. Although a preload on the bearings is changed, the rigidity does not become so large, and it is therefore difficult to raise the resonance frequency.

Thus, the resonances as described in the above paragraphs (a) and (b) occur in a general magnetic disk drive in the prior art, so that a servo band cannot be raised to a frequency higher than about 1 kHz. Accordingly, a tracking error cannot be sufficiently compressed, and it is therefore very difficult to improve a track pitch. To cope with this, there has been proposed a so-called two-stage actuator having a main actuator and a subactuator mounted on the main actuator. A voice coil motor (VCM) is used as driving means for the main actuator as in the prior art, and a piezoelectric element is used as driving means for the subactuator, thereby achieving accurate positioning of a head. For example, two piezoelectric elements are located on the opposite sides of an actuator arm, wherein a voltage is applied to the piezoelectric elements in such a direction that one of the piezoelectric elements expands and the other contracts. As a result, the head is rotated to the side where the other piezoelectric element is located.

Another type two-stage actuator employing an electrostatic actuator or an electromagnetic actuator as a subactuator has also been proposed. Each of the piezoelectric actuator and the electrostatic actuator is a kind of displacement type actuator such that if an input to the subactuator is constant, the condition of the subactuator is stable. In contrast, the electromagnetic actuator is an acceleration type actuator, the condition of which is unstable.

In general, the actuator of a magnetic disk drive is feedback-controlled. At the time of factory shipment of a magnetic disk drive, the calibration of a feedback control system is carried out to decide parameters of the control system. Further, because the environment changes in the use of the magnetic disk drive, the calibration of the feedback control system is carried out at given periods or at starting up the magnetic disk drive to thereby correct the parameters of the feedback control system to optimum values.

A calibration method for a feedback control system in the prior art will now be described with reference to FIG. 1. An actuator 2 in a prior art magnetic disk drive is a single actuator using a VCM as driving means. FIG. 1 is a block diagram of a feedback control system for the single actuator 2. The control system for the actuator 2 is a one-input one-output system having an input $u(k)$ and an output $y(k)$, and the parameter to be calibrated is only an equivalent gain $k_v$. The input-displacement characteristic of the actuator 2 is approximated by $k_v/s^2$ where s is a Laplace operator. In other words, the dynamic characteristic of the actuator 2 is obtained by a double integral of input x $k_v$.

A controller 4 is composed of a nominal controller 6 and a gain compensator 8 having a compensation gain $K_{cv}$. In the conventional calibration method, $K_{cv}$ x $k_v$ is adjusted so as to coincide with a nominal equivalent gain $K_{VN}$. That is, a sinusoidal disturbance $d(k)$ generated in a disturbance generator 10 is inserted into a control input $u(k)$ to the actuator 2, and a response (open-loop gain) to the insertion is measured to thereby execute the calibration. Alternatively, a specified acceleration is input for a given period of time without the control, and a resultant velocity or traveled distance is measured to thereby execute the calibration.

In the case that the actuator control system has one input and one output and that only one parameter is to be calibrated, the above calibration method is applicable to a single actuator. However, the above conventional calibration method is not applicable to a double (two-stage) actuator in the case that the actuator control system has two inputs and one output and that two or more parameters are to be calibrated.

SUMMARY OF THE INVENTION

It is therefore an object of the present invention to provide an effective calibration method for a feedback control system for a two-stage actuator.

In accordance with an aspect of the present invention, there is provided a calibration method for a feedback control system for a two-stage actuator having a main actuator using a voice coil motor as driving means and a subactuator mounted on the main actuator, comprising the steps of cutting off a control loop for the subactuator to fix a control input $u_p(k)$ to the subactuator to 0; inserting a sinusoidal disturbance $d_v(k)$ into a control input $u_v(k)$ to the main actuator; comparing $u_v(k)$ and $u_v(k)+d_v(k)$ to obtain an open-loop gain; setting the reciprocal of the open-loop gain in a gain compensator for the main actuator; adding a sinusoidal disturbance $d_p(k)$ to an input to the subactuator with the control loop for the subactuator being kept cut off; comparing the sinusoidal disturbance $d_p(k)$ with an output $y(k)$ from the two-stage actuator to obtain a disturbance input-displacement gain; dividing a design nominal value by the disturbance input-displacement gain to obtain a compensation gain; and setting the compensation gain in a gain compensator for the subactuator.

In accordance with another aspect of the present invention, there is provided a calibration method for a feedback control system for a two-stage actuator having a main actuator using a voice coil motor as driving means and a subactuator mounted on the main actuator, comprising the steps of inserting a first sinusoidal disturbance $d_v(k)$ into a control input $u_v(k)$ to the main actuator; comparing the first sinusoidal disturbance $d_v(k)$ with an output $y(k)$ from the two-stage actuator to obtain a first gain of disturbance input-positional error; dividing a first design nominal value by the first gain of disturbance input-positional error to obtain a first compensation gain; setting the first compensation gain in a gain compensator for the main actuator; inserting a second sinusoidal disturbance $d_p(k)$ into a control input $u_p(k)$ to the subactuator; comparing the second sinusoidal disturbance $d_p(k)$ with the output $y(k)$ from the two-stage actuator to obtain a second gain of disturbance input-positional error; dividing a second design nominal value by the second gain of disturbance input-positional error to obtain a second compensation gain; and setting the second compensation gain in a gain compensator for the subactuator.

Preferably, the step of lowering a control band of the control system as a whole by a given band is inserted before the step of inserting the first sinusoidal disturbance into the control input to the main actuator, whereby the frequency characteristic of an error transfer function becomes flat at 0 dB in a wide range. Since the gain of the error transfer function becomes 1 (0 dB) in a wide frequency band, the first and second compensation gains can be easily obtained.

Further, the step of obtaining the first compensation gain for the main actuator and the step of obtaining the second compensation gain for the subactuator may be simultaneously carried out by using sinusoidal disturbances having different frequencies, thereby reducing the calibration time. In this case, the frequency of the sinusoidal disturbance for the subactuator, that is, the frequency of the second sinusoidal disturbance is set higher. The frequency of the second sinusoidal disturbance is required to be at least 4/3 times the frequency of the first sinusoidal disturbance.

In accordance with a further aspect of the present invention, there is provided a calibration method for a feedback control system for a two-stage actuator having a main actuator using a voice coil motor as driving means, a plurality of displacement type subactuators mounted on the main actuator, a plurality of heads respectively mounted on the displacement type subactuators, first and second head ICs, and first and second demodulators, comprising the steps of cutting off a control loop for each of the subactuators to fix a control input $u_p(k)$ to each subactuator to 0; inserting a sinusoidal disturbance $d_v(k)$ into a control input $u_v(k)$ to the main actuator; comparing $u_v(k)$ and $u_v(k)+d_v(k)$ to obtain an open-loop gain; setting the reciprocal of the open-loop gain in a gain compensator for the main actuator; feedback controlling the main actuator and one of the subactuators to move one of the heads onto a track; changing an input to another one of the subactuators; demodulating the position of the head mounted on the another subactuator to obtain an input-displacement gain; dividing a design nominal value by the input-displacement gain to obtain a compensation gain; and setting the compensation gain in a gain compensator for the another subactuator.

In the case of using an accelerator type subactuator such as an electromagnetic actuator in place of each accelerator type subactuator, the step of changing an input to another one of the subactuators is replaced by the step of adding a sinusoidal input to another one of the subactuators. The other steps are similar to those in the case of using the displacement type subactuators mentioned above.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
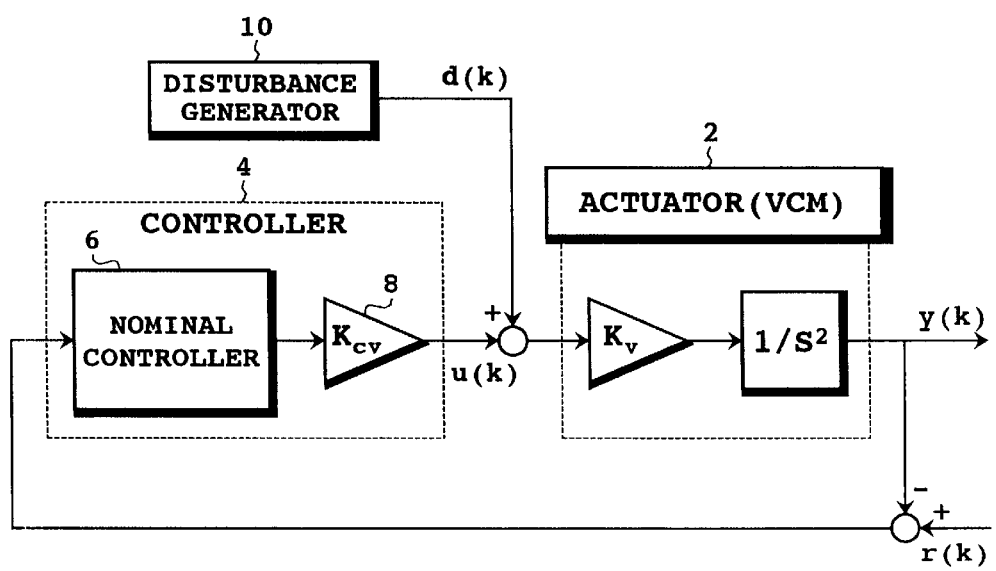
FIG. 1 is a block diagram showing a control system for a single actuator in the prior art.
Figure 2:
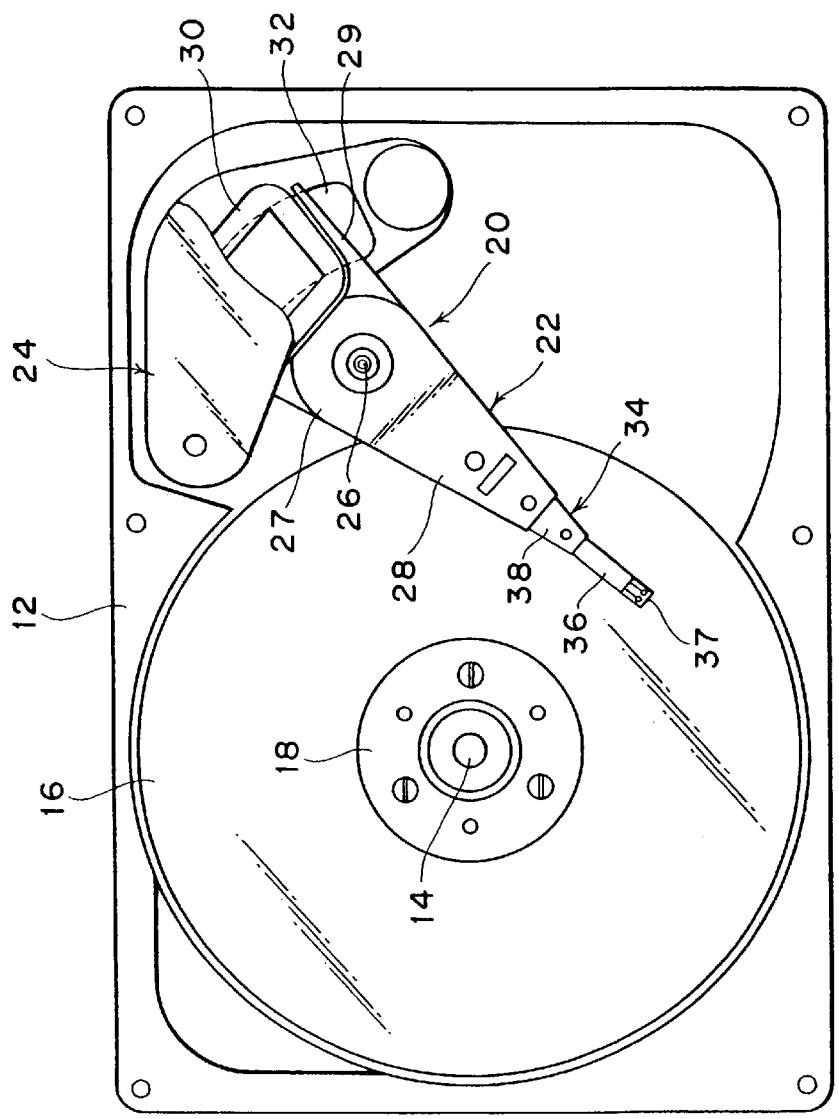
FIG. 2 is a plan view of a magnetic disk drive to which the calibration method of the present invention is applicable.

Referring to FIG. 2, there is shown a plan view of a magnetic disk drive including a two-stage actuator to which the calibration method of the present invention is applicable. Reference numeral 12 denotes a base of the magnetic disk drive. A shaft 14 is fixed to the base 12. A spindle hub (not shown) is rotatably mounted on the shaft 14 so as to be driven by an inner hub motor (not shown). A plurality of magnetic disks 16 and spacers (not shown) are mounted on the spindle hub in such a manner as to be alternately stacked. That is, the plural magnetic disks 16 are fixedly mounted on the spindle hub by securing a disk clamp 18 to the spindle hub by means of screws, and are equally spaced a given distance by the spacers.

Reference numeral 20 denotes a rotary two-stage actuator consisting of a main actuator 22 and a subactuator 34 mounted on the main actuator 22. The main actuator 22 includes an actuator block 27 rotatably mounted through bearings on a shaft 26 fixed to the base 12.

The actuator block 27 is integrally formed with a plurality of actuator arms 28 extending in one direction, and also with a coil supporting member 29 projecting opposite to the actuator arms 28 with respect to the shaft 26 whose axis is the center of rotation of the rotary two-stage actuator. A flat coil 30 is supported by the coil supporting member 29. A magnetic circuit 32 is mounted on the base 12. The flat coil 30 and the magnetic circuit 32 constitute a voice coil motor (VCM) 24.

The subactuator 34 is mounted on a front end portion of each actuator arm 28. The subactuator 34 includes a suspension 36 and a head mounting plate 38 spot-welded to a base end portion of the suspension 36. The head mounting plate 38 is rotatably mounted on the front end portion of each actuator arm 28. A flexure 37 is formed at a front end portion of the suspension 36, and a magnetic head is mounted on the flexure 37.

Figure 3:
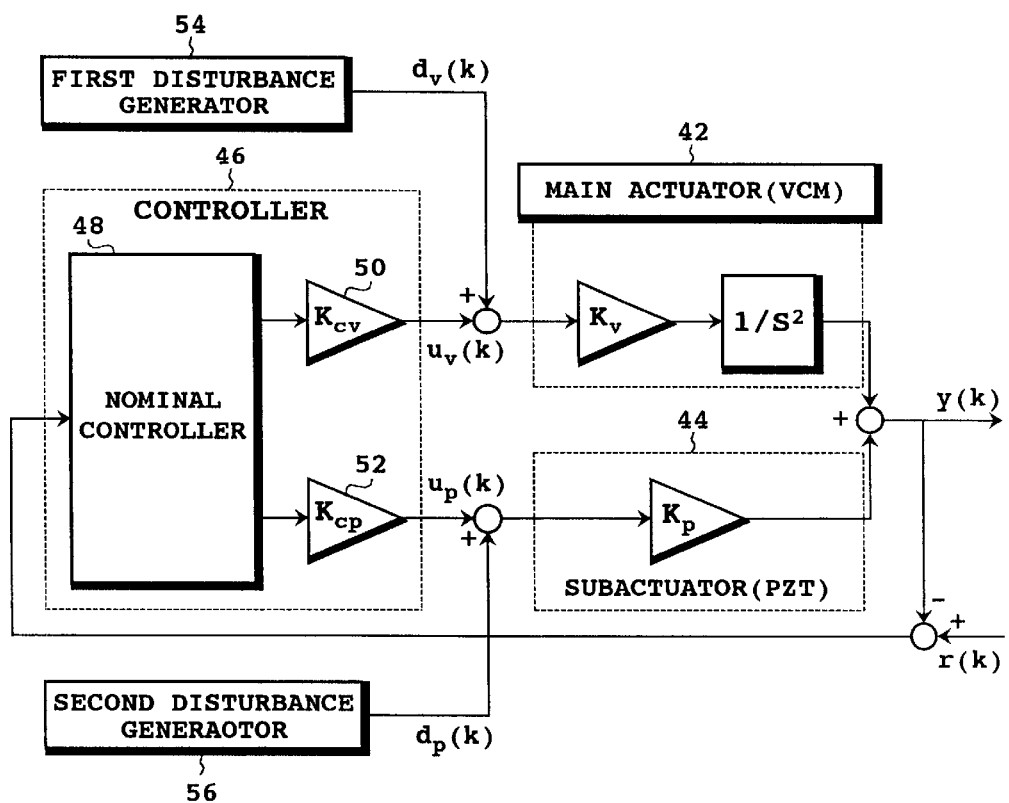
FIG. 3 is a block diagram showing a control system for a two-stage actuator to which the calibration method of the present invention is applicable.

Referring to FIG. 3, there is shown a block diagram of a feedback control system for a two-stage actuator to which the calibration method of the present invention is applied. The two-stage actuator includes a main actuator 42 and a subactuator 44. The main actuator 42 is a voice coil motor (VCM), and its input-displacement characteristic (transfer function) is approximated by $k_v/s^2$ where $k_v$ is an equivalent gain and s is a Laplace operator. In other words, the dynamic characteristic of the main actuator 42 is approximated by a double integral of input x $k_v$. The subactuator 44 is a piezoelectric actuator, and its input-displacement characteristic (transfer function) is approximated by $k_p$.

A controller 46 includes a nominal controller 48, a first gain compensator 50 having a compensation gain $K_{cv}$, and a second gain compensator 52 having a compensation gain $k_{cp}$. The nominal controller 48 has nominal models of the main actuator 42 and the subactuator 44, and is designed so as to ensure a robust stability against expected model errors.

Figure 4:
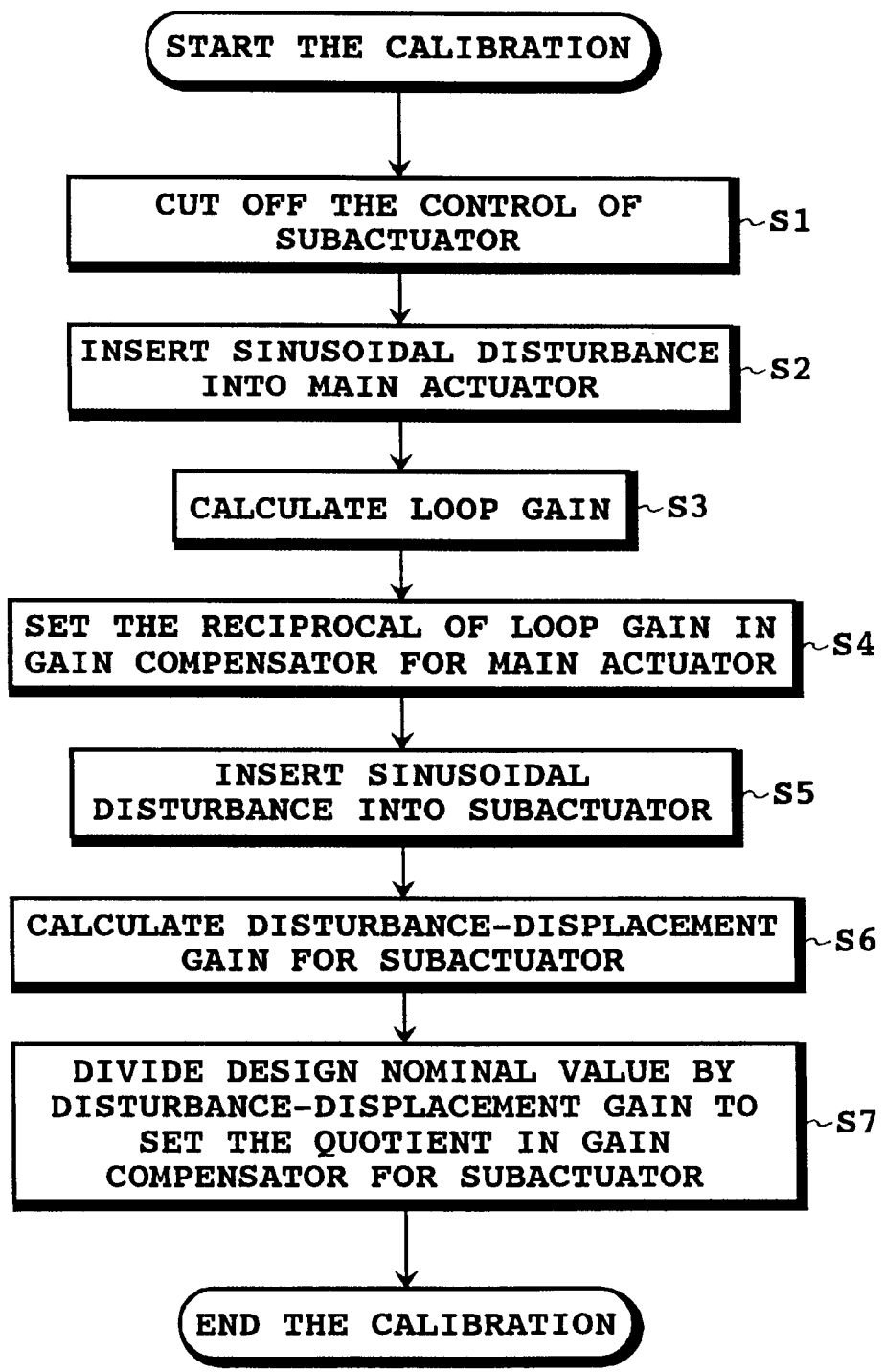
FIG. 4 is a flowchart showing a calibration method according to a first preferred embodiment of the present invention.

FIG. 4 is a flowchart showing a calibration method according to a first preferred embodiment of the present invention. In an initial condition, each of the compensation gains $K_{cv}$ and $k_{cp}$ is 1. In step S1, a control loop for the subactuator 44 is cut off to fix a control input $u_p(k)$ to the subactuator 44 to 0. In step S2, a sinusoidal disturbance $d_v(k)$ generated in a first disturbance generator 54 is added to a control input $u_v(k)$ to the main actuator 42. The frequency of the sinusoidal disturbance is a design nominal value (e.g., 600 to 700 Hz) of the crossover frequency in an open-loop characteristic in the case of controlling only the main actuator 42.

In step S3, $u_v(k)$ and $u_v(k)+d_v(k)$ are compared with each other to obtain an open-loop gain by using discrete Fourier transform (DFT). The reciprocal of the open-loop gain is equal to $K_{cv}$, and therefore it is set in the first gain compensator 50 (step S4). Accordingly, the open-loop gain at the design crossover frequency becomes 1 (0 dB). The program proceeds to step S5, in which the control loop for the subactuator 44 is kept cut off and a sinusoidal disturbance $d_p(k)$ generated in a second disturbance generator 56 is added to an input to the subactuator 44. The frequency of this sinusoidal disturbance is a frequency at which the gain of an error transfer function crosses 0 dB.

The sinusoidal disturbance $d_p(k)$ and an output y(k) from the two-stage actuator are compared with each other to obtain a gain of disturbance input-positional error by using discrete Fourier transform (step S6). Since the gain of the error transfer function is 1 (0 dB), the gain of disturbance input-positional error is equal to a disturbance input-displacement gain, i.e., $k_p$. In step S7, the design nominal value is divided by the disturbance input-displacement gain to obtain a compensation gain kcpt which is then set in the second gain compensator 52. In the calculation of the open-loop gain in step S3, the use of discrete Fourier transform may be replaced by simple calculation of a ratio between the amplitude of $u_v(k)$ and the amplitude of $u_v(k)+d_v(k)$.

Figure 5:
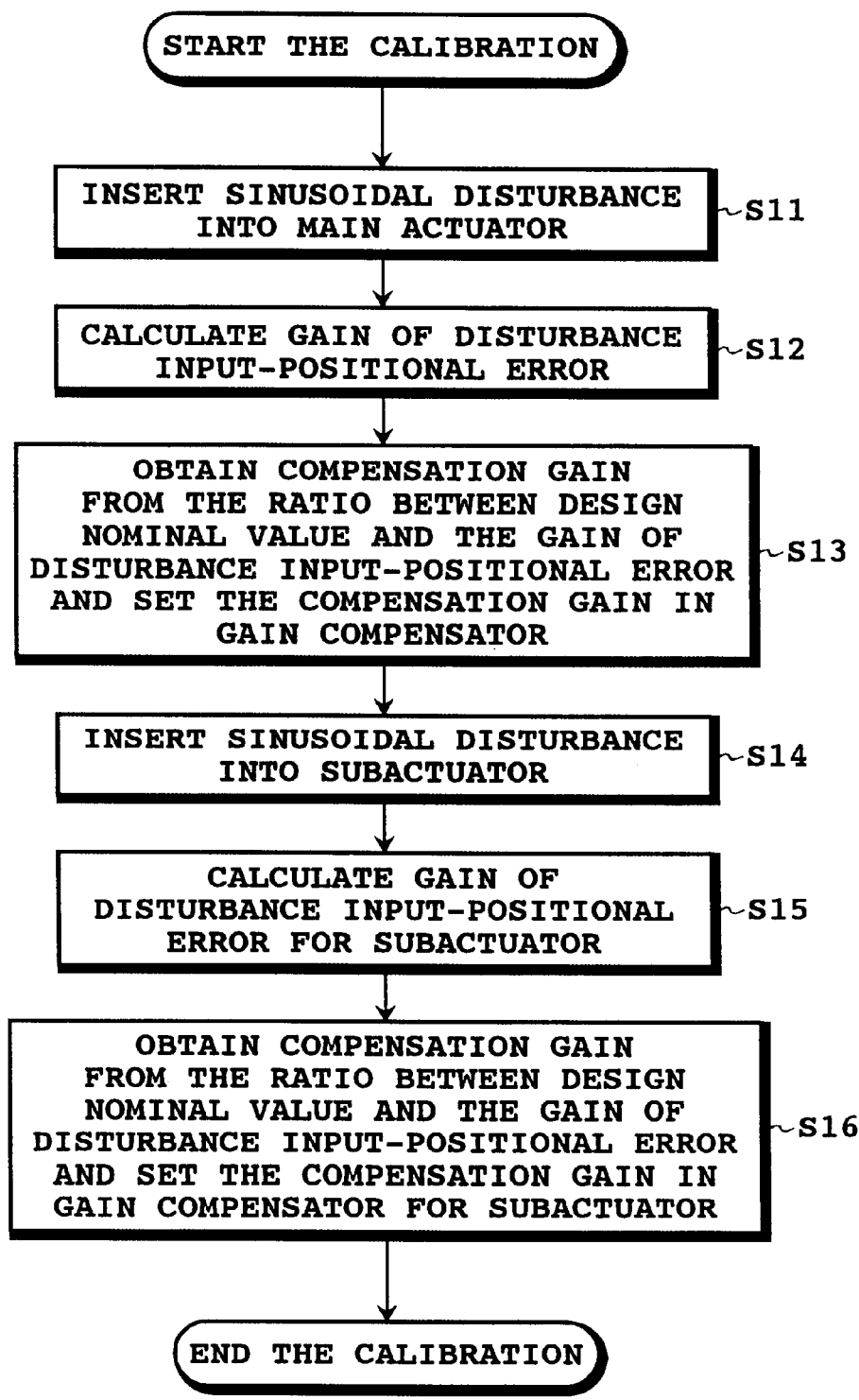
FIG. 5 is a flowchart showing a calibration method according to a second preferred embodiment of the present invention.

Referring to FIG. 5, there is shown a calibration method according to a second preferred embodiment of the present invention. In step S11, a sinusoidal disturbance $d_v(k)$ generated in the first disturbance generator 54 is added to a control input $u_v(k)$ to the main actuator 42. The frequency of the sinusoidal disturbance is selected in the range where the gain of the error transfer function becomes 0 dB. In step S12, the sinusoidal disturbance $d_v(k)$ and the output y(k) from the two-stage actuator are compared with each other to obtain a gain of disturbance input-positional error by using discrete Fourier transform. The design nominal value is divided by the gain of disturbance input-positional error to obtain a compensation gain $K_{cv}$, which is then set in the first gain compensator 50 (step S13).

The program proceeds to step S14, in which a sinusoidal disturbance $d_p(k)$ generated in the second disturbance generator 56 is added to a control input $u_p(k)$ to the subactuator 44. The frequency of the sinusoidal disturbance is selected in the range where the gain of the error transfer function becomes 0 dB. In step S15, the sinusoidal disturbance $d_p(k)$ and the output y(k) from the two-stage actuator are compared with each other to obtain a gain of disturbance input-positional error by using discrete Fourier transform. The program proceeds to step S16, in which the design nominal value is divided by the gain of disturbance input-positional error obtained in step S15 to obtain a compensation gain $k_{cp}$, which is then set in the second gain compensator 52.

As a modification of the second preferred embodiment, steps S11 to S13 may be modified in such a manner that a maximum value and a minimum value are removed from values measured with sinusoidal disturbances having five kinds of frequencies and that an average of the remaining values is calculated to obtain the compensation gain $K_{cv}$. As another modification of the second preferred embodiment, steps S11 to 513 may be modified in such a manner that a temporary average of values measured with sinusoidal disturbances having five kinds of frequencies is calculated and that if the difference between the temporary average and any of the measured values exceeds 10% of the temporary average, the corresponding value or values is/are removed and an average of the remaining values is calculated to obtain the compensation gain $K_{cv}$.

Figure 6:
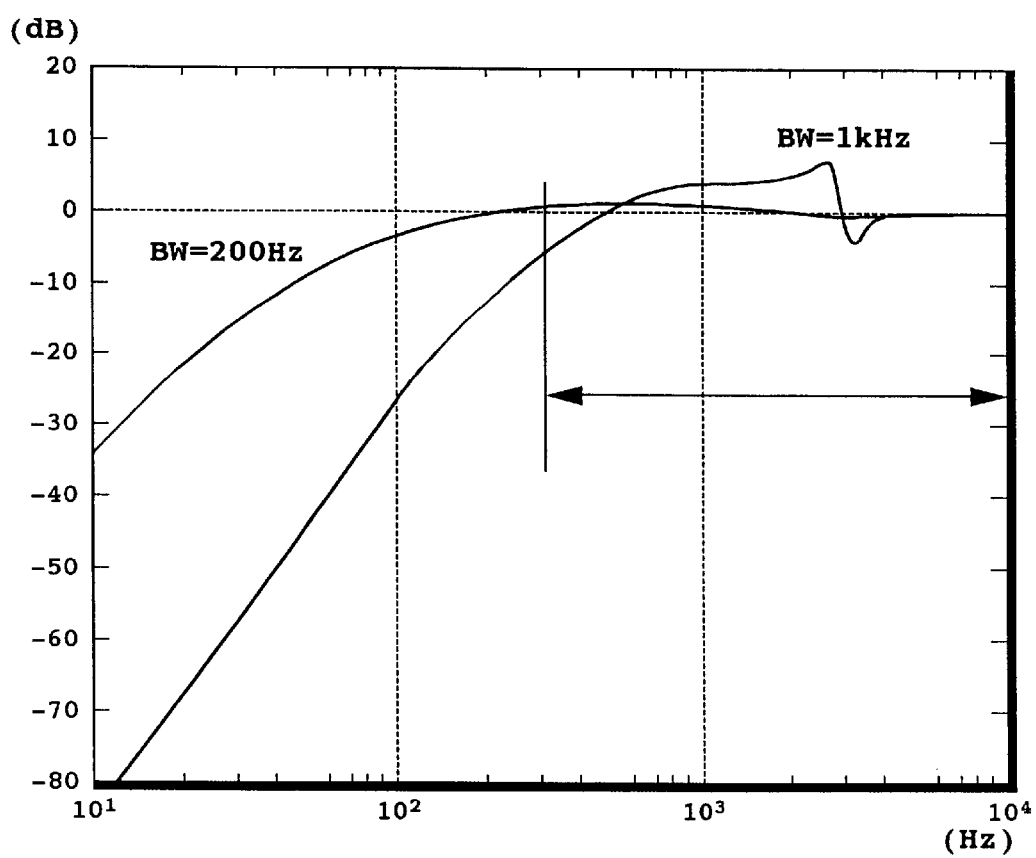
FIG. 6 is a graph showing a frequency characteristic of error transfer function.

As another modification of the second preferred embodiment, a third preferred embodiment to be described below is considered. In the third preferred embodiment, step S10 to be described below is inserted before step S11 of the second preferred embodiment. In step S10, a control band of the controller 46 is temporarily lowered by a given band so that the frequency characteristic of error transfer function becomes flat at 0 dB in a wide range. For example, as shown in FIG. 6, the control band is lowered from a normal control band of 1 kHz to about 200 Hz by reducing the total open-loop gain to ⅟10 only when the calibration is performed.

Accordingly, the gain of error transfer function becomes flat at 0 dB in a frequency region higher than 300 to 400 Hz. In the case that a mechanical resonance point is present at about 3 kHz, almost no flat region at 0 dB for the gain of error transfer function exists in the original control band. However, by lowering the control band down to about 200 Hz, the gain of error transfer function can be made flat at 0 dB in a frequency region of 400 Hz to 1 kHz. As a result, the frequency region of the sinusoidal disturbances to be generated in the first disturbance generator 54 and the second disturbance generator 56 can be broadened.

As another modification of the second preferred embodiment, a fourth preferred embodiment to be described below is considered. In the fourth preferred embodiment, steps S11 to S13 and steps S14 to S16 of the second preferred embodiment are simultaneously executed by using different frequencies to thereby shorten the calibration time. More specifically, the frequency of the second sinusoidal disturbance to be generated in the second disturbance generator 56 is set to at least 4/3 times the frequency of the first sinusoidal disturbance to be generated in the first disturbance generator 54, and the number of servo samples in one period of the second sinusoidal disturbance and the number of servo samples in one period of the first sinusoidal disturbance have no common prime factors. Furthermore, the measurement is made within a time period such that the total number of samples is equal to the product of the number of servo samples on the main actuator side and the number of servo samples on the subactuator side.

As another modification of the second preferred embodiment, a fifth preferred embodiment to be described below is considered. In the fifth preferred embodiment, the amplitude of the sinusoidal disturbance to be generated in the first disturbance generator 54 is set so that the amplitude of a positional disturbance becomes five tracks or more in executing the calibration of the main actuator 42. As a result, the influence of a steady-state disturbance expected to be 10% or less of a track width can be suppressed to 2% or less. In executing the calibration of the subactuator 44 whose amplitude is limited, sinusoidal disturbances having five kinds of frequencies are generated in the second disturbance generator 56 to calculate gains of disturbance input-positional error. Then, a maximum value and a minimum value are removed from the resultant values, and an average of the remaining values is calculated, thereby removing the influence of a steady-state disturbance having a specific frequency.

As a modification of the fifth preferred embodiment mentioned above, sinusoidal disturbances having a plurality of frequencies generated in the second disturbance generator 56 are simultaneously inserted into the control input $u_p(k)$ to the subactuator 44. Then, gains of disturbance input-positional error are calculated at the respective frequencies by using discrete Fourier transform, thereby reducing the calibration execution time.

Figure 7:
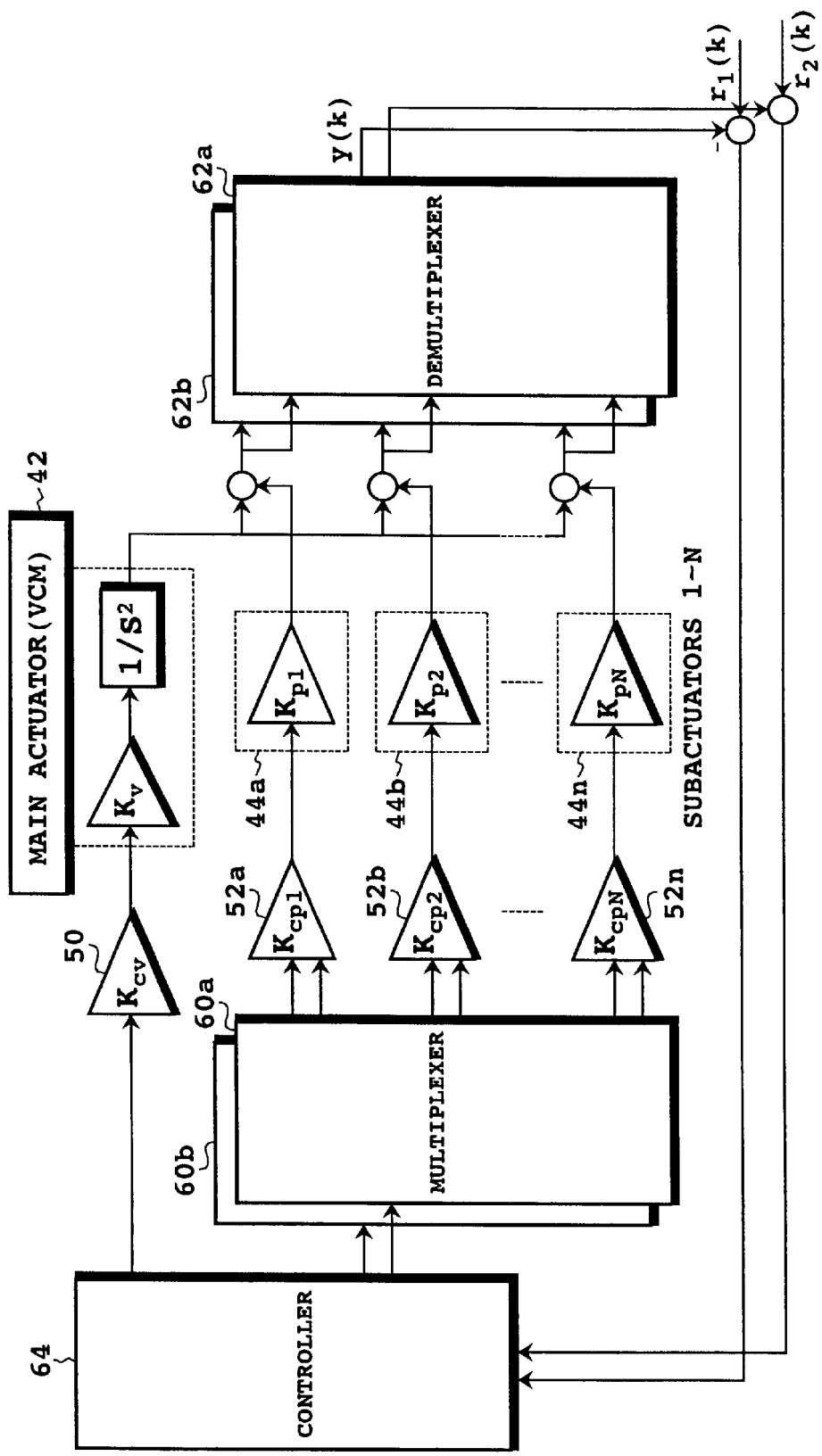
FIG. 7 is a block diagram showing a control system for another two-stage actuator to which the calibration method of the present invention is applicable.

Referring to FIG. 7, there is shown a block diagram of a feedback control system for another two-stage actuator. The main actuator 42 is a voice coil motor (VCM). N displacement type subactuators 44a to 44n for N heads are mounted on the main actuator 42. As each of the displacement type subactuators 44a to 44n, a piezoelectric actuator or an electrostatic actuator may be adopted. The magnetic disk drive has two head ICs (not shown) and two demodulators (not shown). Multiplexers 60a and 60b are connected to each head IC, and demultiplexers 62a and 62b are connected to each demodulator. The positions of arbitrary two heads can be demodulated by the demultiplexers 62a and 62b.

A controller 64 is a digital controller having inputs of two channels and outputs of three channels for control of each actuator. The calibration of the control system shown in FIG. 7 is executed in the following manner. The calibration of the main actuator 42 is executed so as to follow steps S1 to S4 of the first preferred embodiment shown in FIG. 4.

The calibration of the subactuators 44a to 44n is executed in the following manner. The main actuator 42 and one of the subactuators 44a to 44n, e.g., the subactuator 44a are feedback-controlled to move one of the heads onto a track. In this condition, an input to another one of the subactuators 44a to 44n, e.g., the subactuator 44b is changed to demodulate the position of the head mounted on the subactuator 44b and obtain an input-displacement gain.

The design nominal value is divided by the input-displacement gain to obtain a compensation gain $k_{cp2}$, which is then set in a gain compensator 52b. For the other subactuators 44c to 44n, compensation gains $k_{cp3}$ to $K_{cpN}$ are similarly obtained to be set in gain compensators 52c to 52n, respectively. In this preferred embodiment, the nonlinear characteristics of the subactuators 44a to 44n can also be measured to thereby realize higher-precision control.

As a modification of this preferred embodiment, the subactuators 44a to 44n may be of an acceleration type. In this case, the calibration is executed in the following manner. As each of the acceleration type subactuators 44a to 44n, an electromagnetic actuator may be adopted, for example. The calibration of the main actuator 42 is executed so as to follow steps S1 to S4 of the first preferred embodiment.

The calibration of the subactuators 44a to 44n is executed in the following manner. The main actuator 42 and an arbitrary one of the subactuators 44a to 44n, e.g., the subactuator 44a are feedback-controlled to move the head mounted on the subactuator 44a onto a track. In this condition, a sinusoidal input is added to another one of the subactuators 44a to 44n, e.g., the subactuator 44b to demodulate the position of the head mounted on the subactuator 44b and obtain an input-displacement gain by using discrete Fourier transform. The design nominal value is divided by the input-displacement gain to obtain a compensation gain $K_{cp2}$, which is then set in the gain compensator 52b.

According to the present invention, the calibration of a two-stage actuator that is impossible by the conventional calibration method can be made possible. Further, according to the preferred embodiment wherein the response of the main actuator and the subactuator is made simultaneously at a plurality of frequencies, the calibration execution time can be reduced to ½ or less as compared with the case where the measurements are separately made.

By temporarily lower the control band of the controller, the frequency characteristic of an error transfer function can be made flat at 0 dB in a wide range, so that the frequency of disturbance can be easily selected. Further, by shifting the frequency of disturbance to a low-frequency region, discretization errors both in disturbance generation and in response calculation can be reduced.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A calibration method for a feedback control system for a two-stage actuator having a main actuator using a voice coil motor as driving means and a subactuator mounted on said main actuator, comprising the steps of:

cutting off a control loop for said subactuator to fix a control input $u_p(k)$ to said subactuator to 0;

inserting a sinusoidal disturbance $d_v(k)$ into a control input $u_v(k)$ to said main actuator;

comparing $u_v(k)$ and $u_v(k)+d_v(k)$ to obtain an open-loop gain;

setting the reciprocal of said open-loop gain in a gain compensator for said main actuator;

adding a sinusoidal disturbance $d_p(k)$ to an input to said subactuator with said control loop for said subactuator being kept cut off;

comparing said sinusoidal disturbance $d_p(k)$ with an output y(k) from said two-stage actuator to obtain a disturbance input-displacement gain;

dividing a design nominal value by said disturbance input-displacement gain to obtain a compensation gain; and setting said compensation gain in a gain compensator for said subactuator.

2. A calibration method according to claim 1, wherein said open-loop gain is obtained by using discrete Fourier transform.

3. A calibration method according to claim 1, wherein said open-loop gain is obtained by calculating a ratio between the amplitude of $u_v(k)$ and the amplitude of $u_v(k)+d_v(k)$.

4. A calibration method for a feedback control system for a two-stage actuator having a main actuator using a voice coil motor as driving means and a subactuator mounted on said main actuator, comprising the steps of:

inserting a first sinusoidal disturbance $d_v(k)$ into a control input $u_v(k)$ to said main actuator;

comparing said first sinusoidal disturbance $d_v(k)$ with an output y(k) from said two-stage actuator to obtain a first gain of disturbance input-positional error;

dividing a first design nominal value by said first gain of disturbance input-positional error to obtain a first compensation gain;

setting said first compensation gain in a gain compensator for said main actuator;

inserting a second sinusoidal disturbance $d_p(k)$ into a control input $u_p(k)$ to said subactuator;

comparing said second sinusoidal disturbance $d_p(k)$ with the output y(k) from said two-stage actuator to obtain a second gain of disturbance input-positional error;

dividing a second design nominal value by said second gain of disturbance input-positional error to obtain a second compensation gain; and setting said second compensation gain in a gain compensator for said subactuator.

5. A calibration method according to claim 4, wherein said first compensation gain is obtained by removing a maximum value and a minimum value from values measured with first sinusoidal disturbances having a plurality of kinds of frequencies and calculating an average of the remaining values.

6. A calibration method according to claim 4, wherein said first compensation gain is obtained by calculating a temporary average of values measured with first sinusoidal disturbances having a plurality of kinds of frequencies, removing any of said values if the difference between said temporary average and said any value exceeds 10% of said temporary average, and calculating an average of the remaining values.

7. A calibration method according to claim 4, further comprising the step of lowering a control band of said control system as a whole by a given band before said step of inserting said first sinusoidal disturbance, whereby the frequency characteristic of an error transfer function becomes flat at 0 dB in a wide range.

8. A calibration method according to claim 4, wherein the insertion of the first sinusoidal disturbance into the control input to said main actuator and the insertion of the second sinusoidal disturbance into the control input to said subactuator are simultaneously carried out, and the frequency of said second sinusoidal disturbance is 4/3 or more of the frequency of said first sinusoidal disturbance.

9. A calibration method according to claim 4, wherein the amplitude of said first sinusoidal disturbance is set so that the amplitude of a positional disturbance to said main actuator becomes five tracks or more.

10. A calibration method according to claim 9, wherein said second gain of disturbance input-positional error is obtained by simultaneously inserting second sinusoidal disturbances having a plurality of frequencies into the control input to said subactuator, and using discrete Fourier transform at the respective frequencies.

11. A calibration method for a feedback control system for a two-stage actuator having a main actuator using a voice coil motor as driving means, a plurality of displacement type subactuators mounted on said main actuator, a plurality of heads respectively mounted on said displacement type subactuators, first and second head ICs, and first and second demodulators, comprising the steps of:

cutting off a control loop for each of said subactuators to fix a control input $u_p(k)$ to each subactuator to 0;

inserting a sinusoidal disturbance $d_v(k)$ into a control input $u_v(k)$ to said main actuator;

comparing $u_v(k)$ and $u_v(k)+d_v(k)$ to obtain an open-loop gain;

setting the reciprocal of said open-loop gain in a gain compensator for said main actuator;

feedback controlling said main actuator and one of said subactuators to move one of said heads onto a track;

changing an input to another one of said subactuators;

demodulating the position of said head mounted on said another subactuator to obtain an input-displacement gain;

dividing a design nominal value by said input-displacement gain to obtain a compensation gain; and setting said compensation gain in a gain compensator for said another subactuator.

12. A calibration method for a feedback control system for a two-stage actuator having a main actuator using a voice coil motor as driving means, a plurality of acceleration type subactuators mounted on said main actuator, a plurality of heads respectively mounted on said acceleration type subactuators, first and second head ICs, and first and second demodulators, comprising the steps of:

cutting off a control loop for each of said subactuators to fix a control input $u_p(k)$ to each subactuator to 0;

inserting a sinusoidal disturbance $d_v(k)$ into a control input $u_v(k)$ to said main actuator;

comparing $u_v(k)$ and $u_v(k)+d_v(k)$ to obtain an open-loop gain;

setting the reciprocal of said open-loop gain in a gain compensator for said main actuator;

feedback controlling said main actuator and one of said subactuators to move one of said heads onto a track;

adding a sinusoidal input to another one of said subactuators;

demodulating the position of said head mounted on said another subactuator to obtain an input-displacement gain;

dividing a design nominal value by said input-displacement gain to obtain a compensation gain; and setting said compensation gain in a gain. compensator for said another subactuator.

* * * * *